United States Patent

Santi et al.

[11] B 3,991,152
[45] Nov. 9, 1976

[54] METHOD OF PLUGGING ARMATURE SLOTS

[75] Inventors: John D. Santi, West Allis; Edward A. Boyd, Sussex, both of Wis.

[73] Assignee: Briggs & Stratton Corporation, Wauwatosa, Wis.

[22] Filed: Mar. 5, 1975

[21] Appl. No.: 555,437

[44] Published under the second Trial Voluntary Protest Program on February 3, 1976 as document No. B 555,437.

Related U.S. Application Data

[63] Continuation of Ser. No. 387,174, Aug. 9, 1973, abandoned.

[52] U.S. Cl. .............................. 264/161; 264/162; 264/251; 264/254; 264/267; 264/272; 264/274; 264/310; 264/331

[51] Int. Cl.[2] ............... H02K 15/06; H02K 15/12; B29D 3/00; B29F 5/00

[58] Field of Search ........... 264/249, 254, 263, 267, 264/272, 274, 279, 310, 251, 162, 134, 161, 319, 331; 29/596, 597, 205 CM, 205 E, 205 R; 310/214

[56] References Cited
UNITED STATES PATENTS

| | | | |
|---|---|---|---|
| 1,182,982 | 5/1916 | Crump | 118/409 |
| 1,416,987 | 5/1922 | Sharpe | 425/218 |
| 1,524,915 | 2/1925 | De Bay | 425/219 |
| 1,751,430 | 3/1930 | Thomson | 264/162 |
| 1,902,551 | 3/1933 | Fredrickson | 29/205 E |
| 2,368,085 | 1/1945 | Barbieri | 264/162 |
| 3,071,496 | 1/1963 | Fromm et al. | 264/272 |
| 3,129,349 | 4/1964 | Ervin | 29/597 |
| 3,182,219 | 5/1965 | Quinn | 29/597 |
| 3,689,280 | 9/1972 | Werner | 425/220 |

OTHER PUBLICATIONS

Randolph et al, Plastics Engineering Handbook, Reinhold, (1960) pp. 217-222.

Primary Examiner—Willard E. Hoag
Attorney, Agent, or Firm—Ira Milton Jones

[57] ABSTRACT

To form winding slot plugs in a dynamoelectric machine armature, viscous uncured plastic is fed onto the cylindrical surface of the armature core, intermediate its ends, while the armature is rotated in contact with a paddle that wipingly forces the plastic into the winding slots. Preferably this is done simultaneously with coating the windings. The viscous plug material comprises the same plastic used for coating the windings, but admixed with enough inert powered material to be nonflowing.

6 Claims, 4 Drawing Figures

METHOD OF PLUGGING ARMATURE SLOTS

This application is a continuation of copending application Ser. No. 387,174, filed Aug. 9, 1973, and now abandoned.

This invention relates to armatures for dynamoelectric machines and is more particularly concerned with slot plugs by which the winding conductors of such armatures are confined in their slots in the armature core.

The armature or rotor of an electric motor or generator of the type to which this invention relates comprises a substantially cylindrical core that is usually formed from a stack of identical laminations. Numerous winding slots extend substantially axially from end to end of the core and open radially outwardly to its circumferential surface, and in these are received straight stretches of conductors that comprise the armature windings. Other portions of the winding conductors extend from slot to slot around the end portions of the core. Usually the winding slots have narrow mouths defined by opposite ledges that extend inwardly from the sides of each slot.

Ordinarily the windings are impregnated with a varnish or resinous coating material that is applied to them in a fluid state and is cured to hardness, usually by baking. The coating material insulates the winding conductors from one another and from the core and also serves as an encapsulation and bond that prevents the windings from shifting and rubbing.

Certain small motors, such as those for electric engine starters, are likely to be operated at speeds high enough to impose substantial centrifugal forces upon their winding conductors, tending to displace them out of the winding slots. Since such high speed operation is usually accompanied by high operating temperature, the straight conductor stretches in the winding slots elongate due to thermal expansion, and the heat causes the coating material on the windings to lose some portion of its bonding strength, thus leaving the windings very susceptible to centrifugal displacement. To prevent such displacement and confine the windings in the slots, it is conventional to employ slot plugs which close the mouths of the slots.

Heretofore each such slot plug has comprised a strip of wood or plastic that was pushed endwise or edgewise into the slot, to be confined between the conductors in the slot and the undersides of the ledges at the slot mouth. For production efficiency the slot plugs for an armature were of uniform thickness. But the windings filled the slots to varying depths, and therefore some slot plugs fitted so loosely that they could slide endwise out of their slots while others had to be driven into place forcefully. The coating material that was applied to the windings after the plugs were installed was relied upon to hold the loose plugs in place.

Manual installation of slot plugs was of course tedious and relatively slow. To the extent that slot plugs could be installed automatically, complicated and expensive machinery was required. In any case, installation of slot plugs entailed a separate and time consuming operation in the production of an armature, and slot plugs therefore represented a substantial factor in armature cost.

By contrast, it is the general object of this invention to provide novel winding slot plugs for dynamoelectric machine armatures, and a novel method of installing such slot plugs that achieves a substantial reduction in that portion of the cost of such armatures which is attributable to slot plugs.

It is a further object of this invention to provide a winding slot plug that has intimate bonding engagement with surface portions of the core that define the slot in which it is received and with the winding portions lying in that slot, and which, moreover, has an integral bond with insulating material that coats and encapsulates the armature windings.

Another important object of the invention is to provide a method of forming armature winding slot plugs that can be practiced substantially simultaneously with impregnation of the armature windings, thus avoiding the cost and delay of a separate slot plug installing operation and reducing the floor space required for armature manufacture.

It is also an object of this invention to provide a very expeditious method of forming slot plugs, capable of being practiced automatically with a slightly modified version of a machine used for coating and encapsulating armature windings and requiring little or no adjustment of that machine to accommodate it to armatures of a wide range of sizes.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
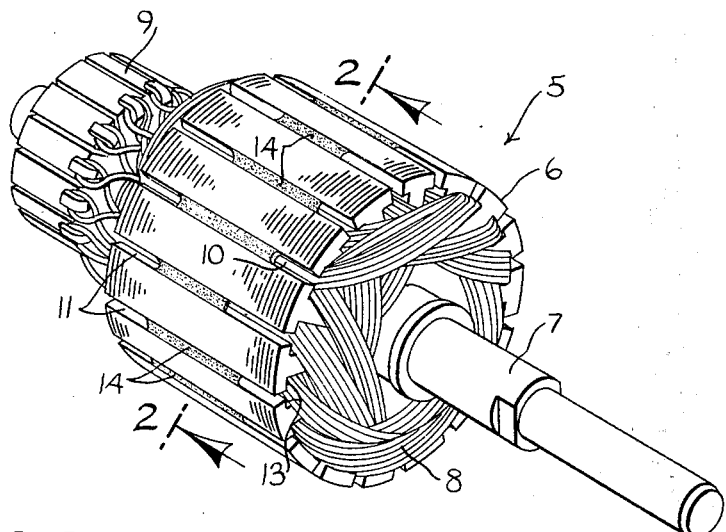
FIG. 1 is a perspective view of an armature having slot plugs made according to the principles of this invention.
Figure 2:
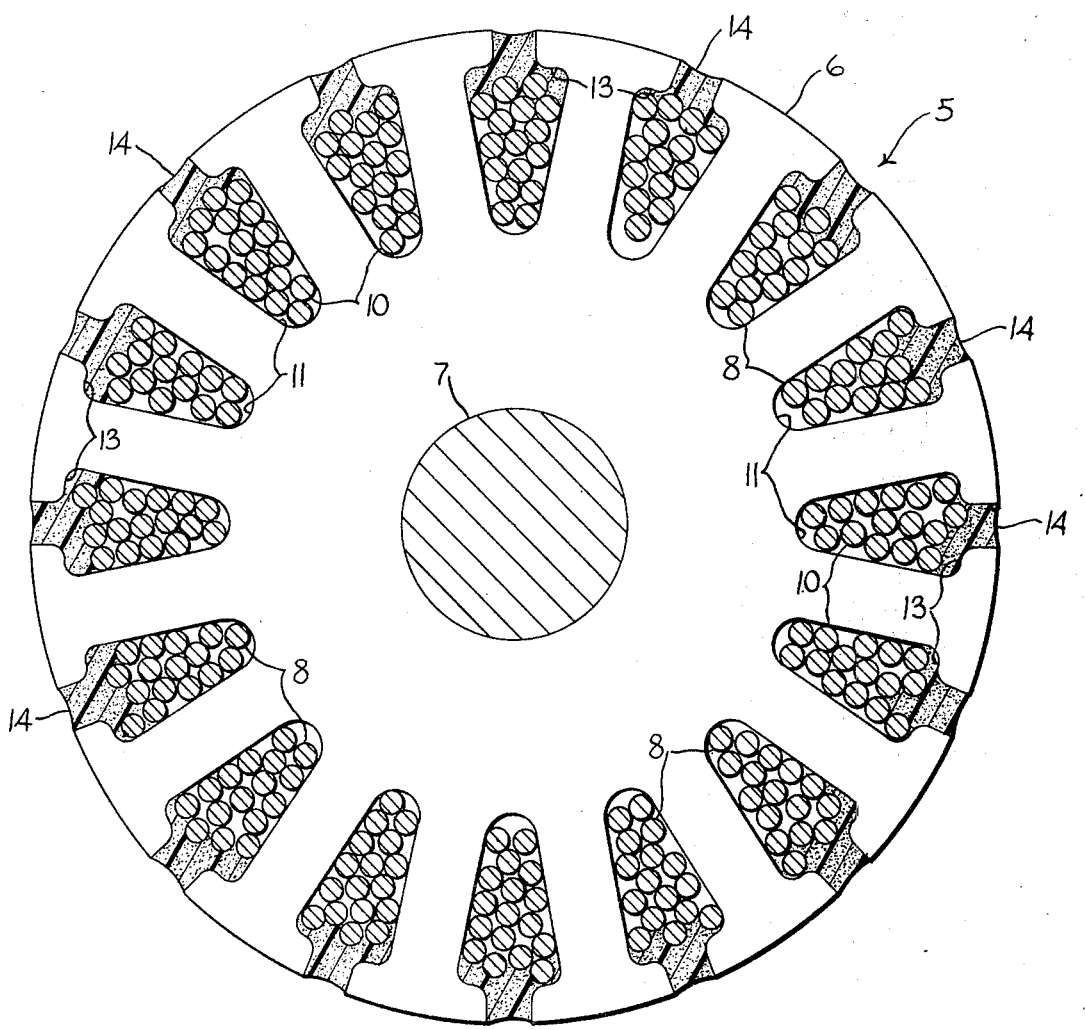
FIG. 2 is a cross sectional view on an enlarged scale taken on the plane of the line 2–2 in FIG. 1.
Figure 4:
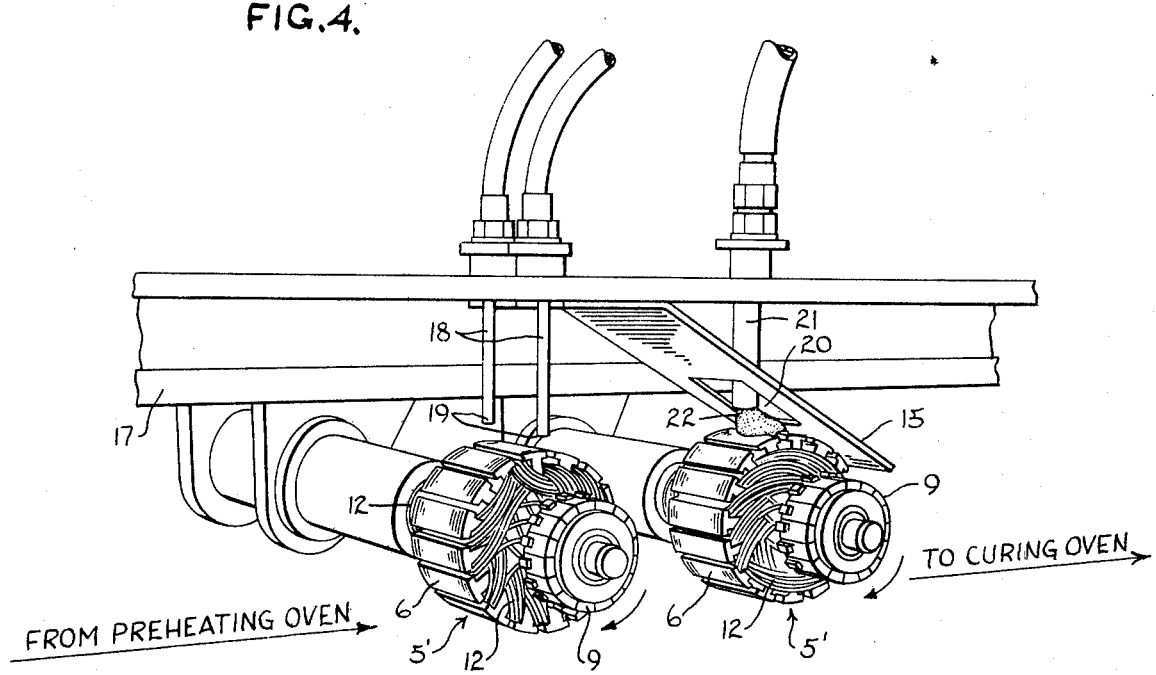
Figure 3:
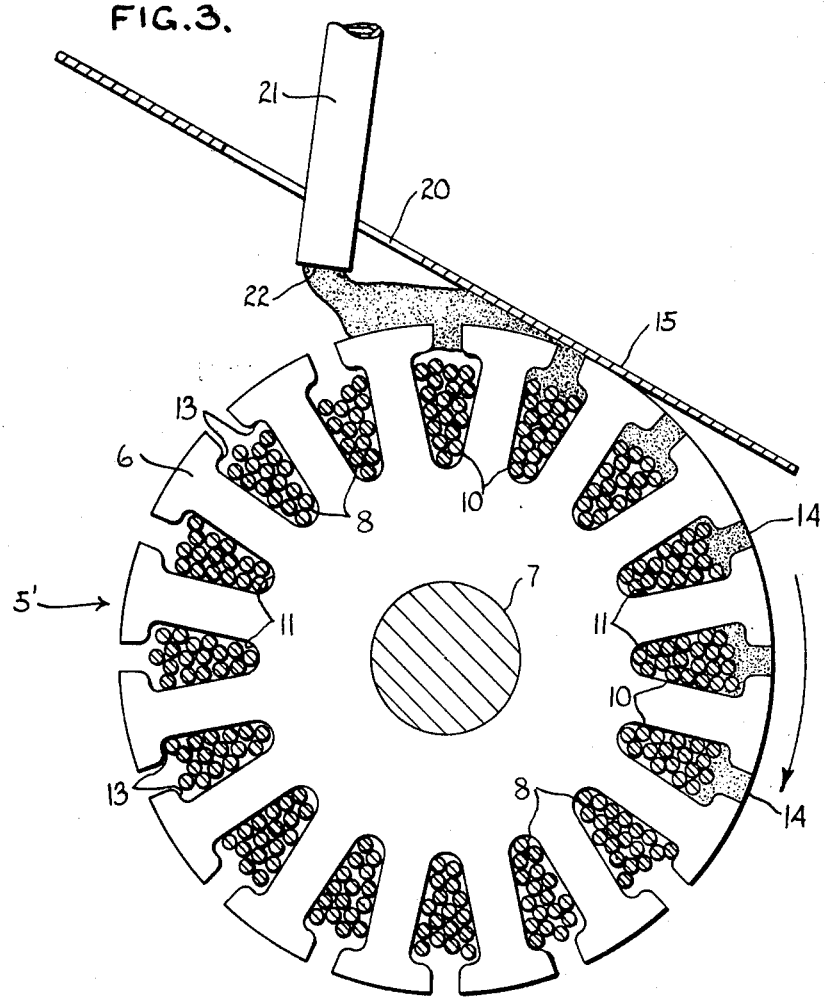

FIG. 3 is a view generally similar to FIG. 2 but showing the slot plug forming method of this invention in practice, with plugs already formed in some of the winding slots of an armature; and FIG. 4 is a fragmentary perspective view of a station on an armature processing line at which winding slot plugs are formed according to the principles of this invention substantially simultaneously with impregnation of the armature windings.

Referring now more particularly to the accompanying drawings, the numeral 5 designates generally a finished armature for a d.c. dynamoelectric machine, such as a starter motor, that embodies the principles of this invention. As is conventional, the armature 5 comprises a substantially cylindrical core 6 that is made up of a stack of identical laminations, a shaft 7 that extends coaxially through the core, windings 8 that embrace portions of the core, and a commutator 9 on the shaft in axially spaced relation to the core and to which end portions of the winding conductors are connected.

Straight stretches 10 of the winding conductors are received in winding slots 11 that extend axially through the core and open radially outwardly. Other portions of the winding conductors comprise end loops 12 that extend from slot to slot around end portions of the core. As is conventional, the winding slots 11 are radially deep and have relatively narrow mouths defined by opposite ledges 13 that project towards one another partway across each slot from the side surfaces thereof. The conductor stretches 10 that lie in each winding slot are all disposed radially inwardly of the ledges 13 and are confined in the slot by a slot plug 14 of this invention.

In the finished armature each slot plug 14 extends axially through a medial portion of its slot, terminating some distance short of the ends of the core. For reasons which will appear hereinafter, the several slot plugs in an armature may be of varying lengths; but since they are all of substantially equal mass and are relatively light in weight, such differences in length do not affect the dynamic balance of the armature. Furthermore, since the slot plugs extend a substantial distance along the medial portion of each straight stretch of conductor, they afford entirely adequate confinement of the conductors in the slots even when they are substantially shorter than the core. An additional reason why the slot plugs 14 afford exceptionally good stabilization of the winding conductors is that they are in intimate bonding engagement with substantial portions of both the conductors and the core and are integrally bonded to the insulating material with which the conductors are impregnated. Such bonding of the slot plugs is a novel and important feature of the present invention that results from the manner in which they are formed and the material of which they are made. The finished plugs are made of a cured plastic material admixed with a finely divided inert thickening material, the latter being present in the mixture in a proportion sufficient to cause the plastic material in its uncured state to have a viscosity high enough to be substantially incapable of flowing under the force of gravity even when the mixture is at the curing temperature of the plastic.

Inasmuch as the plastic material is preferably one that is suitable for the impregnation of armature windings, those concerned with the art of manufacturing armatures will be familiar with several commmercial preparations that are suitable for the purpose. In general, the plastic material should be one that has good electrical insulating characteristics and, when cured, maintains good creep strength at the highest expectable motor operating temperatures. In a preferred practice of the invention the plastic material is a polyester which is sold especially for winding impregnation and which comes in the form of two components that are mixed just before use. That material is cured by baking at about 350°F. and when cured can withstand temperatures up to about 500°F. without degrading.

The inert material which is admixed with the plastic can be, for example, a micronized (very finely powdered) silica, such as that sold under the trademark "Cabosil." In addition to imparting to the uncured plastic the high viscosity needed for the practice of the method of this invention, the powdered silica, being inert and electrically nonconductive, improves the performance characteristics of the cured plastic material in the slot plugs of this invention.

In the practice of the method of this invention a wound armature 5' is rotated in contact with a paddle 15 or the like that defines a flat surface tangent to the circumferential surface of the armature core, and a quantity of the above described very viscous mixture is fed towards the core in such a manner as to be wipingly forced into the winding slots by the paddle as the armature is rotated. The armature is then baked to cure the plastic, after which the excess plug material is cleaned off of its circumferential surface by abrasion.

As here illustrated, the slot plugs are applied at a station along a conveyor stretch 17 at which impregnating material is substantially simultaneously applied to the end loops of the windings. Armatures are mounted on the conveyor with their shafts extending horizontally and transversely to the direction of conveyor travel. They are brought to the station at a temperature which is at least as high as the curing temperature of the plastic material, i.e., 350°F. or somewhat higher.

The armature move through the station in two steps, in the first of which the impregnating material is applied and in the second of which the slot plugs are formed. The armatures are rotated during both applications, and as they move on to a curing oven (not shown) their rotation can be continued, to prevent running and dripping of the impregnating material.

As an armature makes its first stop at the application station, impregnating material is deposited on the end loops 12 of its windings from ducts 18 that have their outlets 19 located just above the end loops. The impregnating material is preferably the same plastic that is used for the slot plugs, but with the thickening material omitted. By reason of the fluidity of the impregnating material, and owing at least in part to capillary action, that material spreads over and among the conductors and is drawn along them into the winding slots a sufficient distance to enter the zones that will be occupied by the slot plugs, so that the impregnating material can merge with the slot plug material to be integrally bonded thereto in the finished armature and thus assure good, secure anchorage of the conductors.

The impregnating material is applied to the end loops at a rate that is in step with the rate at which it flows and spreads along the windings. It has been found that the rate at which the viscous slot plug material is dispensed can be readily coordinated with the application of impregnating material so that equal times are required for the two operations and therefore they can be performed simultaneously on two adjacent armatures along the conveyor stretch 17 with substantially continuous discharge of both types of material.

As here illustrated, the paddle 15 employed for slot plug formation comprises a somewhat elongated resiliently flexible metal blade that is anchored to fixed structure at its upper end and extends lengthwise downwardly across an armature that it engages and obliquely forwardly in the direction of advance of the conveyor stretch 17. An armature making its second stop at the station bears against the paddle under substantial resilient biasing force, to insure that as the armature rotates the viscous material will be forced into the winding slots as far as it will go and will be substantially prevented from passing the paddle and forming a thick coating on the circumferential surface of the core.

As the conveyor advances the armatures, the armature engaged with the paddle flexes it upwardly and passes beneath it. Note that the flexibility of the paddle affords automatic adaptation of the apparatus to armatures with cores of different diameters.

As shown, the paddle 15 has a medial hole 20 through which a duct 21 extends to have its output 22 just below the paddle and in a position to deposit the viscous material issuing therefrom onto the top of an armature core engaged with the paddle. The armature is rotated in the direction to carry its top towards the paddle, that is, in the direction of conveyor advance. It will be understood that a suitable pump (not shown) may be provided to force the viscous material out of the outlet 22 at the desired rate.

As an armature rotates in contact with the paddle 15, substantially uniform quantities of viscous material are forced into all of its winding slots, owing to the fact that both armature rotation and emission of the viscous material occur at a steady rate. However, the windings tend to fill the various slots to different depths, and this accounts for the varying lengths of the slot plugs in the finished armature.

From the foregoing description taken with the accompanying drawings it will be apparent that this invention provides a novel method for forming the winding slot plugs of dynamoelectric machine armatures, which method can be practiced with the use of simple and inexpensive equipment and substantially simultaneously with the application of coating and encapsulating material to the armature windings. It will also be apparent that the slot plugs formed by the method of this invention afford unusually secure retention and confinement of the windings inasmuch as they are intimately bonded to substantial portions of the windings they overlie and the core surfaces in the slots in which those windings are received and are also integrally bonded to the encapsulating coating on the end loops of the windings.

Those skilled in the art will appreciate that the invention can be embodied in forms other than as herein disclosed for purposes of illustration.

The invention is defined by the following claims:

1. The method of plugging the mouths of axially extending, radially outwardly opening winding slots in a substantially cylindrical dynamoelectric machine rotor core to confine in said slots lengths of conductors which comprise the rotor windings of the machine and which are all disposed radially inwardly of opposite ledges that project towards one another across each slot to define a narrow mouth for it, said method being characterized by:
   A. supporting the core for rotation about a fixed axis with its circumferential surface bearing against a substantially flat surface of a paddle at least along a zone of the core that is intermediate its ends;
   B. depositing between said surface and the rotor core in said zone a quantity of a plastic insulating material that can be cured to substantial hardness and which material is sufficiently viscous to resist flow under the force of gravity;
   C. effecting rotation of the rotor core about its axis relative to said paddle to wipingly force said material into the axially medial portions of the winding slots and under the ledges thereof so that the material thus forced beneath the ledges can form a mechanical interlock with the core; and
   D. curing said material.

2. The method of plugging the mouths of axially extending, radially outwardly opening winding slots in a substantially cylindrical dynamoelectric machine rotor core to confine in said slots lengths of conductors which comprise the rotor windings of the machine and which are are disposed radially inwardly of opposite ledges on the core that project towards one another across each slot to define a narrow mouth for it, said method being characterized by:
   A. depositing onto the circumferential surface of the rotor core, intermediate the ends thereof, a quantity of a plastic insulating material which can be cured to substantial hardness and which is sufficiently viscous to resist flow under the force of gravity;
   B. by relative rotation of the rotor core about its axis, with the circumferential surface of the core in proximity to a substantially flat surface, wipingly forcing said material into the axially medial portions of the winding slots and under the ledges thereof so that the material thus forced beneath the ledges can form a mechanical interlock with the core; and
   C. curing said material.

3. The method of claim 2, further characterized by: after curing said material, abrasively removing the excess thereof from the circumferential surface portions of the core and the mouths of the slots.

4. The method of claim 2, further characterized by: near the time of deposition of said material onto the rotor core, applying to portions of the windings at both ends of the rotor core a fluid plastic material that has substantially the same cure requirements as said viscous material and is capable of bonding thereto, to thus impregnate the windings with said fluid material.

5. The method of claim 2, further characterized by:
   1. rotating the rotor core at a substantially steady rate during deposition of the plastic insulating material thereon, and
   2. depositing the plastic insulating material onto the rotating rotor core at a substantially steady rate, so that substantially uniform quantities of said material are forced into all of the winding slots to maintain the dynamic balance of the rotor.

6. The method of claim 2 wherein said plastic insulating material comprises a heat curable polyester admixed with finely powdered silica.

* * * * *